April 12, 1949.   J. O. SAMSON   2,466,828
TRIPLE STAGE ROTARY BEATER MILL
Filed May 13, 1947
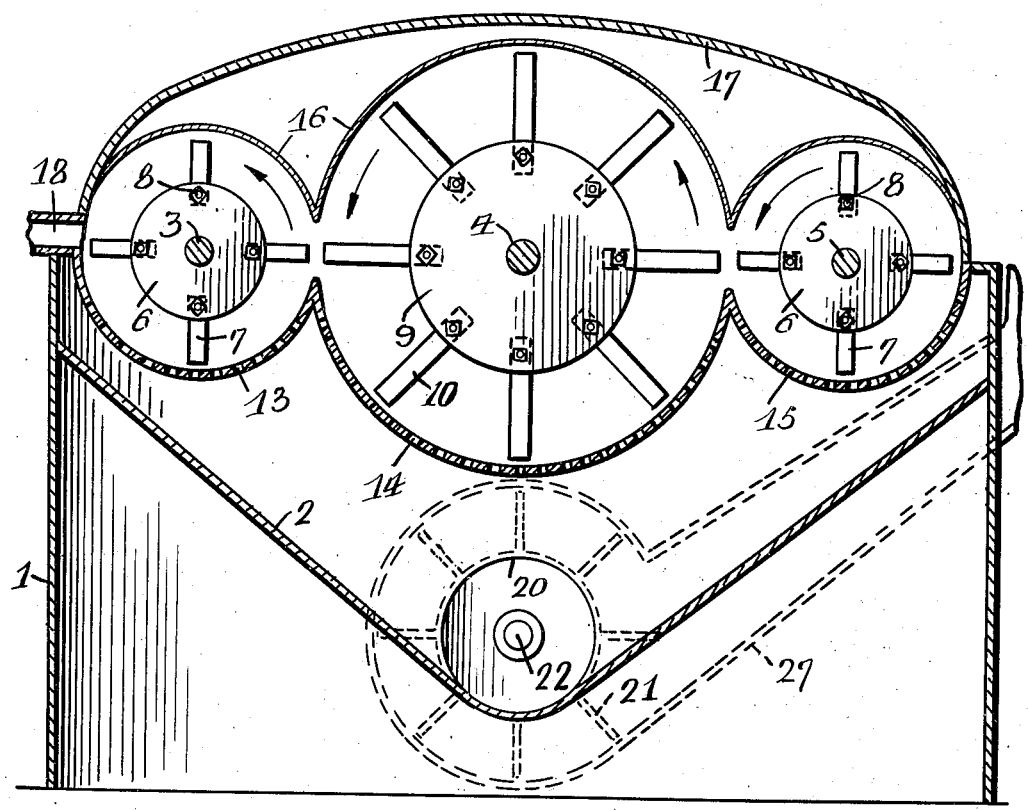
Fig. 1
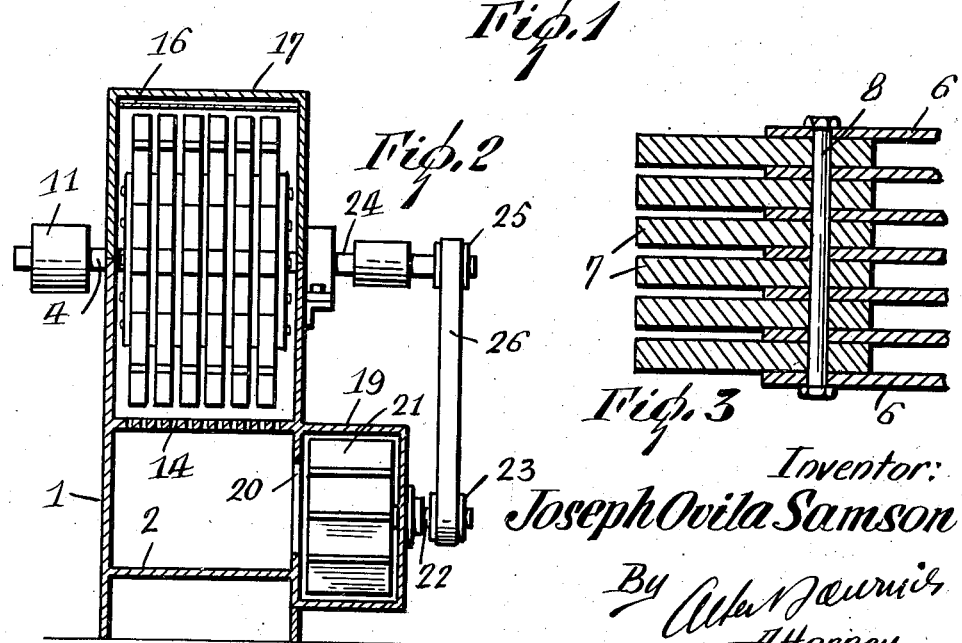
Fig. 2
Fig. 3
Inventor:
Joseph Ovila Samson
By *Albert Jourdies*
Attorney Patented Apr. 12, 1949

2,466,828

UNITED STATES PATENT OFFICE 2,466,828

TRIPLE STAGE ROTARY BEATER MILL

Joseph Ovila Samson, Montreal, Quebec, Canada

Application May 13, 1947, Serial No. 747,764

1 Claim. (Cl. 241—154)

The present invention pertains to a novel hammer mill for pulverizing grain and the like.

The principal object of the invention is to provide a device of this character that has a greater capacity than apparatus of similar size and weight. Ordinarily such a mill consists of two rotating series of radially disposed beaters or hammers arranged so that the members of the respective series come into alinement with each other in close end spacing during rotation of the series. The material that is caught between the closely spaced ends of the alined beaters is crushed or ground thereby.

The present invention differs in providing three sets of beaters in such manner that the two end series cooperate with the intermediate series. Thus, the machine has the capacity of two machines of the usual type described above.

The invention further includes screens beneath the several beaters designed to pass the material only after it has been ground to a given fineness. The material drops into a hopper from which it is picked up by a blower and discharged.

The invention is fully disclosed by way of example in the following description and in the accompanying drawings in which:

Figure 1 is a longitudinal section of the device;

Figure 2 is a vertical section taken at center and showing center beater in elevation; and Figure 3 is a detail section of one of the rotors.

Reference to these views will now be made by use of like characters which are employed to designate corresponding parts throughout.

In Figure 1 is shown a base structure or skirt 1 which encloses a V-shaped bottom member or hopper 2. In the top of the structure 1 is mounted a series of three horizontal and parallel shafts 3, 4 and 5. On each of the shafts 3 and 5 is mounted a series of disks 6 between which are inserted outwardly extending arms or beaters 7. The disks on both shafts are of equal diameter, and the corresponding beaters are of equal length. The beaters adjacent to successive disks are alined in series longitudinal of the respective shafts, and the longitudinal series of beaters are equally spaced apart from each other and on both shafts. The assemblies are held together by tie bolts 8 passed through the disks and through the inner ends of longitudinally alined beaters.

On the central shaft 4 is a similar arrangement of larger disks 9 alternating with outwardly extending beaters 10 arranged in longitudinal series. The disks 9 carry a larger number of series of beaters than the shafts 3 and 5 and also equally spaced about the shaft 4.

Outside of the housing 1, the shaft 4 carries a pulley 11 belted to a suitable power source (not shown). The shafts 3 and 5 may also carry pulleys belted to the pulley 11. The drive gear is preferably such that all three shafts rotate in the same direction and bring the series 7 successively in alinement with the series 10. The outer ends of the blades 10 are at a greater distance from shaft 4 than the outer ends of blades 7 from their respective shafts 3 and consequently have a greater sweep path.

Beneath the shafts are mounted arcuate screens 13, 14 and 15 spaced closely from the corresponding beaters and preferably joined together at the ends as shown in Figure 1. Over the shafts is mounted a similarly shaped cover 16 consisting of arcuate sections inverted with respect to the screens 13, 14 and 15. A smooth cover plate or dome 17 is secured over the cover 16 and is shaped to close upon the base or upon the screens.

A feed pipe 18 extends into the housing 1 at the top thereof and at the outer end of one of the screens. A blower cylinder 19 is mounted adjacent to and outward of the housing 1 and communicates with the latter through an opening 20 below the screens. A bladed rotor 21 is mounted in the cylinder 19 and has an outwardly extending shaft 22 with a pulley 23. The shaft 4 is extended outward of the housing 1 over the cylinder 19, as indicated by the numeral 24 in Figure 2, and there carries a pulley 25 which is connected to the pulley 23 by a belt 26. A discharge duct 27 extends from the cylinder 19 through the housing 1 at a point opposite the feed pipe 18.

In the operation of the device the shafts are rotated in the same direction as already stated. The several series of beaters come successively into alinement for crushing material between the ends thereof. The material is supplied through the pipe 18 and is thrown about by the beaters until so fine as to pass through the screens 13, 14, 15 to the hopper or bottom 2. From here it is drawn through the opening 20 to the blower and discharged through the duct 27. The covers 17 and 16 may be lifted for cleaning and inspection. Because of the arrangement of three shafts and three sets of beaters, the device has twice the capacity or effectiveness of a mill with two shafts. In other words, the single apparatus with an added shaft and set of beaters has the effect of two mills.

Although a specific embodiment of the invention has been illustrated and described, it will be understood that various alterations in the details of construction may be made without departing from the scope of the invention as indicated by the appended claim.

What I claim as my invention is:

A hammer mill comprising a housing, three parallel shafts journalled therein and in one horizontal plane, spaced radial beater arms carried by said shafts and adapted to aline with each other across said shafts with running clearance between their outer ends, the outer ends of the arms on the intermediate shaft being at a greater distance from said shaft than the outer ends of the remaining arms from their respective shafts, means for rotating said shafts, and intake and discharge means for said housing, respectively at opposite sides of said plane.

JOSEPH OVILA SAMSON.

REFERENCES CITED

The following references are of record in the file of this patent:

UNITED STATES PATENTS

| Number | Name | Date |
| --- | --- | --- |
| 553,091 | Woodward | Jan. 14, 1896 |
| 571,588 | Allbrecht | Nov. 17, 1896 |
| 653,363 | Parker | July 10, 1900 |
| 675,751 | Moustier | June 4, 1901 |
| 864,443 | Bailey et al. | Aug. 27, 1907 |
| 1,152,141 | Boero | Aug. 31, 1915 |
| 1,433,042 | Sedberry | Oct. 24, 1922 |
| 1,439,581 | Sedberry | Dec. 19, 1922 |
| 1,628,419 | Nelson | May 10, 1927 |
| 2,280,903 | Ellison | Apr. 28, 1942 |

FOREIGN PATENTS

| Number | Country | Date |
| --- | --- | --- |
| 163,976 | Great Britain | Jan. 4, 1921 |